United States Patent
Pletikosa

(10) Patent No.: US 7,311,454 B2
(45) Date of Patent: *Dec. 25, 2007

(54) MOBILE DEVICE

(75) Inventor: Velimir Pletikosa, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/595,356

(22) Filed: Nov. 9, 2006

(65) Prior Publication Data

US 2007/0053734 A1 Mar. 8, 2007

Related U.S. Application Data

(63) Continuation of application No. 11/178,832, filed on Jul. 11, 2005, now Pat. No. 7,153,049, which is a continuation of application No. 10/788,067, filed on Feb. 26, 2004, now Pat. No. 7,056,043.

(51) Int. Cl.
G06F 3/023 (2006.01)

(52) U.S. Cl. ............... 400/472; 400/489; 400/486; D14/399; D14/391

(58) Field of Classification Search ............ None
See application file for complete search history.

(56) References Cited

U.S. PATENT DOCUMENTS

| | | | |
|---|---|---|---|
| 1,336,151 A | 4/1920 | O'Connor | |
| 1,652,464 A | 12/1927 | Tyberg | |
| 2,532,228 A | 11/1950 | Hesh | |
| 4,420,666 A * | 12/1983 | Kammerer | 200/341 |
| 4,449,839 A | 5/1984 | Bleuer | |
| 4,783,645 A | 11/1988 | Goldwasser et al. | |
| D313,413 S | 1/1991 | Langton | |
| 5,017,030 A | 5/1991 | Crews | |
| 5,156,475 A | 10/1992 | Zilberman | |
| 5,336,001 A | 8/1994 | Lichtenberg | |
| 5,360,280 A | 11/1994 | Camacho et al. | |
| 5,367,298 A | 11/1994 | Axthelm | |
| 5,486,058 A | 1/1996 | Allen | |
| 5,500,643 A | 3/1996 | Grant | |

(Continued)

FOREIGN PATENT DOCUMENTS

JP 055758 2/2002

(Continued)

OTHER PUBLICATIONS

Machine translation of JP 2002055758 to Nakahara from Japanese Patent Office website.*

*Primary Examiner*—Daniel J. Colilla
(74) *Attorney, Agent, or Firm*—Jones Day; Krishna K. Pathiyal; Robert C. Liang

(57) ABSTRACT

An apparatus has a keyboard panel with a QWERTY array of alphabetic key actuation indicia. The apparatus further has a QWERTY array of keys that are free of alphabetic key actuation indicia, and are located adjacent to corresponding alphabetic key actuation indicia on the keyboard panel. Other parts of the apparatus include an output device responsive to actuation of the keys, and a processing device operatively coupled between the keys and the output device. Summarized alternatively, the apparatus includes a keyboard with keys arranged in arcuate horizontal rows. The keys in each row have centerlines projecting radially from a respective common centerpoint.

5 Claims, 3 Drawing Sheets

U.S. PATENT DOCUMENTS

| | | |
|---|---|---|
| 5,503,484 A | 4/1996 | Louis |
| 5,660,488 A | 8/1997 | Miller |
| D383,756 S | 9/1997 | Henderson et al. |
| D416,256 S | 11/1999 | Griffin et al. |
| 6,230,222 B1 | 5/2001 | Rush |
| 6,278,442 B1 | 8/2001 | Griffin et al. |
| 6,310,609 B1 | 10/2001 | Morgenthaler |
| D451,079 S | 11/2001 | Ali |
| 6,359,838 B1 | 3/2002 | Taylor |
| 6,378,234 B1 * | 4/2002 | Luo .......................... 341/22 |
| 6,452,588 B2 | 9/2002 | Griffin et al. |
| 6,489,950 B1 | 12/2002 | Griffin et al. |
| D470,150 S | 2/2003 | Lewis, Jr. et al. |
| D472,225 S | 3/2003 | Griffin |
| 7,056,043 B2 * | 6/2006 | Pletikosa .................... 400/472 |
| 7,153,049 B2 * | 12/2006 | Pletikosa .................... 400/472 |
| 2003/0095107 A1 | 5/2003 | Griffin et al. |
| 2004/0165924 A1 * | 8/2004 | Griffin ........................ 400/486 |

FOREIGN PATENT DOCUMENTS

| | | |
|---|---|---|
| JP | 2002055758 A * | 2/2002 |
| JP | 021745 | 1/2004 |
| WO | 02101531 | 12/2002 |

* cited by examiner

MOBILE DEVICE

RELATED APPLICATIONS

This application is a continuation of U.S. patent application Ser. No. 11/178,832, filed Jul. 11, 2005 now U.S. Pat. No. 7,153,049, which is a continuation of U.S. patent application Ser. No. 10/788,067, filed Feb. 26, 2004 (now U.S. Pat. 7,056,043).

TECHNICAL FIELD

This technology relates generally to the field of input systems for electronic devices, particularly to a keyboard that is especially well-suited for use in a hand-held mobile communication device.

BACKGROUND

Hand-held mobile communication devices may include a combined text-entry and telephony keyboard. Examples of such mobile devices include cellular telephones, wireless personal digital assistants (PDAs), two-way paging devices, and others. The keyboard can be actuated with the fingers of one or both of the user's hands.

SUMMARY

An apparatus has a keyboard panel with a QWERTY array of alphabetic key actuation indicia. The apparatus further has a QWERTY array of keys that are free of alphabetic key actuation indicia, and are located adjacent to corresponding alphabetic key actuation indicia on the keyboard panel. Other parts of the apparatus include an output device responsive to actuation of the keys, and a processing device operatively coupled between the keys and the output device.

Preferably, the keys are horizontally spaced apart form each other in the rows of the QWERTY array, and the corresponding alphabetic key actuation indicia on the keyboard panel is located in the spaces extending horizontally between the keys.

Summarized alternatively, the apparatus includes a keyboard with keys arranged in arcuate horizontal rows. The keys in each row have centerlines projecting radially from a respective common centerpoint.

DETAILED DESCRIPTION

Figure 1:
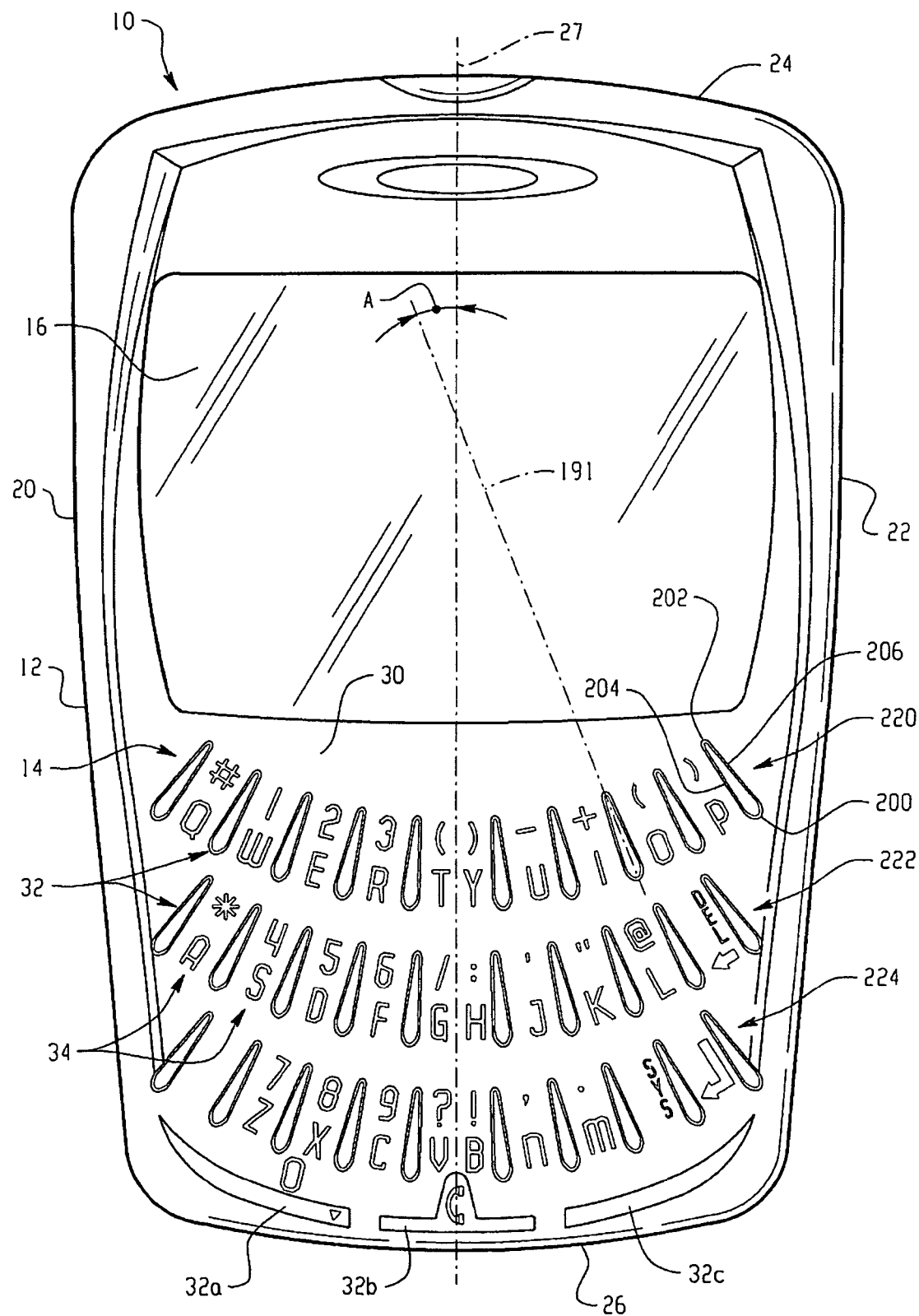
FIG. 1 is a front view of a mobile device with a keyboard.
Figure 2:
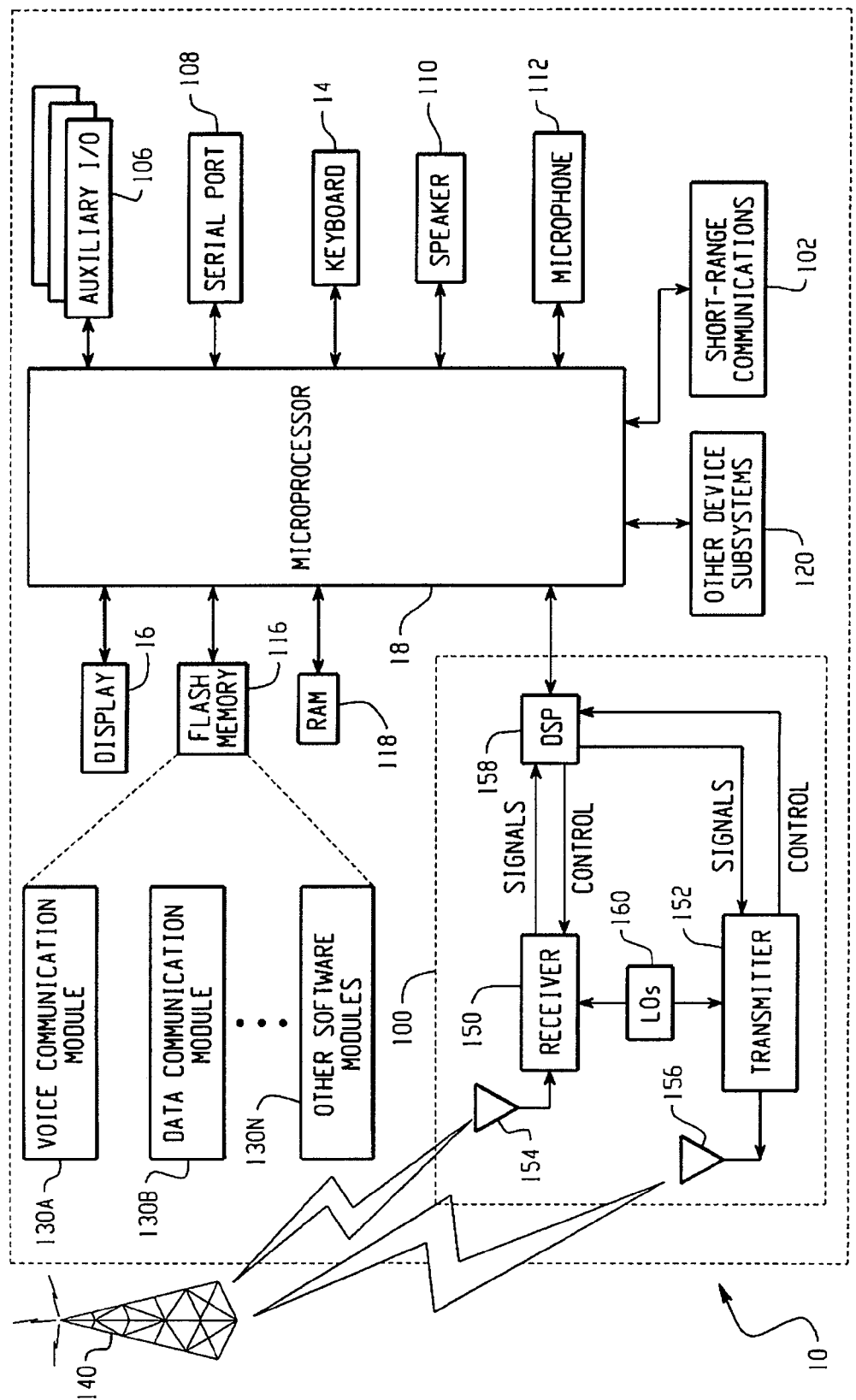
FIG. 2 is a block diagram of parts of the mobile device of FIG. 1.

The apparatus 10 shown in FIG. 1 has parts that are examples of the elements recited in the claims. This apparatus 10 is a hand-held mobile communication device including a housing 12, a keyboard 14 and an output device 16. As shown in FIG. 1, this example of an output device is a display 16, which is preferably a full graphic LCD. A processing device 18, which is shown schematically in FIG. 2, is contained within the housing 12 and is coupled between the keyboard 14 and the display 16. The processing device 18 controls the operation of the display 16, as well as the overall operation of the mobile device 10, in response to actuation of the keyboard 14 by the user.

The housing 12 for this example of a mobile device 10 is elongated vertically, as viewed from the front in the upright position shown in FIG. 1. The housing 12 thus has left and right side edges 20 and 22 extending longitudinally between upper and lower end edges 24 and 26. As further shown in FIG. 1, the surfaces of these parts 12, 14 and 16 at the front of the mobile device 10 are symmetrical about the longitudinal centerline 27 of the housing 12.

The keyboard 14 is defined in part by a front panel 30 of the housing 12, and in part by a plurality of acutatable keys 32 at the panel 30. With the exception of three special keys 32a, 32b and 32c at the bottom of the keyboard 14, the keys 32 are uniformly narrow and elongated, and the actuation indicia 34 for the keys 32 is located on the panel 30 rather than on the keys 32 themselves. The keyboard 14 is configured for operation of the mobile device 10 in a telephony mode, in a text-entry mode, or in both the telephony mode and the text-entry mode. Accordingly, the keys 32 and the corresponding actuation indicia 34 together provide a telephone keypad and an overlapping text-entry keyboard, with mode selection by the central key 32b at the bottom of the keyboard 14.

In addition to the processing device 18, other parts of the mobile device 10 also are shown schematically in FIG. 2. These include a communications subsystem 100; a short-range communications subsystem 102; the keyboard 14 and the display 16, along with other input/output devices 106, 108, 110 and 112; as well as memory devices 116, 118 and various other device subsystems 120. The mobile device 10 is preferably a two-way communication device having voice and data communication capabilities and preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem 102 enables communication between the mobile device 10 and other proximate systems or devices, which need not necessarily be similar devices. For example, the short-range communications subsystem 102 may include an infrared device and associated circuits and components, or a Bluetooth™ communication module to provide for communication with similarly-enabled systems and devices.

The mobile device 10 may also include a predictive text computer program that is used in conjunction with the keyboard 14. A predictive text computer program may, for example, be used to predict a complete word or phrase from one or more keystrokes. If the predictive text computer program does not successfully predict a desired word or phrase, then text-entry characters may be entered more completely, albeit more slowly, by selecting the appropriate characters on the keys 32.

As noted above with reference to FIG. 1, the keyboard 14 has keys 32 with uniformly narrow, elongated configurations. More specifically, those keys 32 are all alike, and each is elongated vertically with reference to the vertical longitudinal centerline 27 of the housing 12. By "elongated vertically" it is meant that the longitudinal centerline 191 of a key 32 is vertical or, as shown in FIG. 1, is inclined downward from the vertical reference line 27 at an angle A of not more than 45 degrees. Each key 32 is tapered with a first rounded end 200, a second rounded end 202 narrower than the first rounded end 200, and a pair of opposite sides 204 and 206 that converge from the first rounded end 200 to the second rounded end 202.

As further noted above, the keys 32 and the corresponding actuation indicia 34 on the keyboard panel 30 together provide a telephone keypad and an overlapping text-entry keyboard. This example of a text-entry keyboard is a QWERTY keyboard with a separate alphabetic key for each letter A-Z. The alphabetic keys 32 are thus arranged in top, middle and bottom rows 220, 222 and 224 that extend horizontally across the keyboard panel 30. The alphabetic keys 32 are horizontally spaced apart from each other in each row 220, 222 and 224, and the corresponding alphabetic actuation indicia 34 is located on the panel 30 in the spaces extending horizontally between the alphabetic keys 32 in each row 220, 222 and 224. Preferably, the alphabetic keys 32 on the left-hand side of the QWERTY array (which in this example is left of the centerline 27) are located to the left of the corresponding indicia 34, and the alphabetic keys 32 on the right-hand side of the QWERTY array are located to the right of the corresponding indicia 34. The keys 32 and the array of numerical key actuation indicia 34 for the telephone keypad, including the zero key 32a at the bottom of the keyboard 14, are located entirely on the left-hand side of the keyboard 14.

Figure 3:
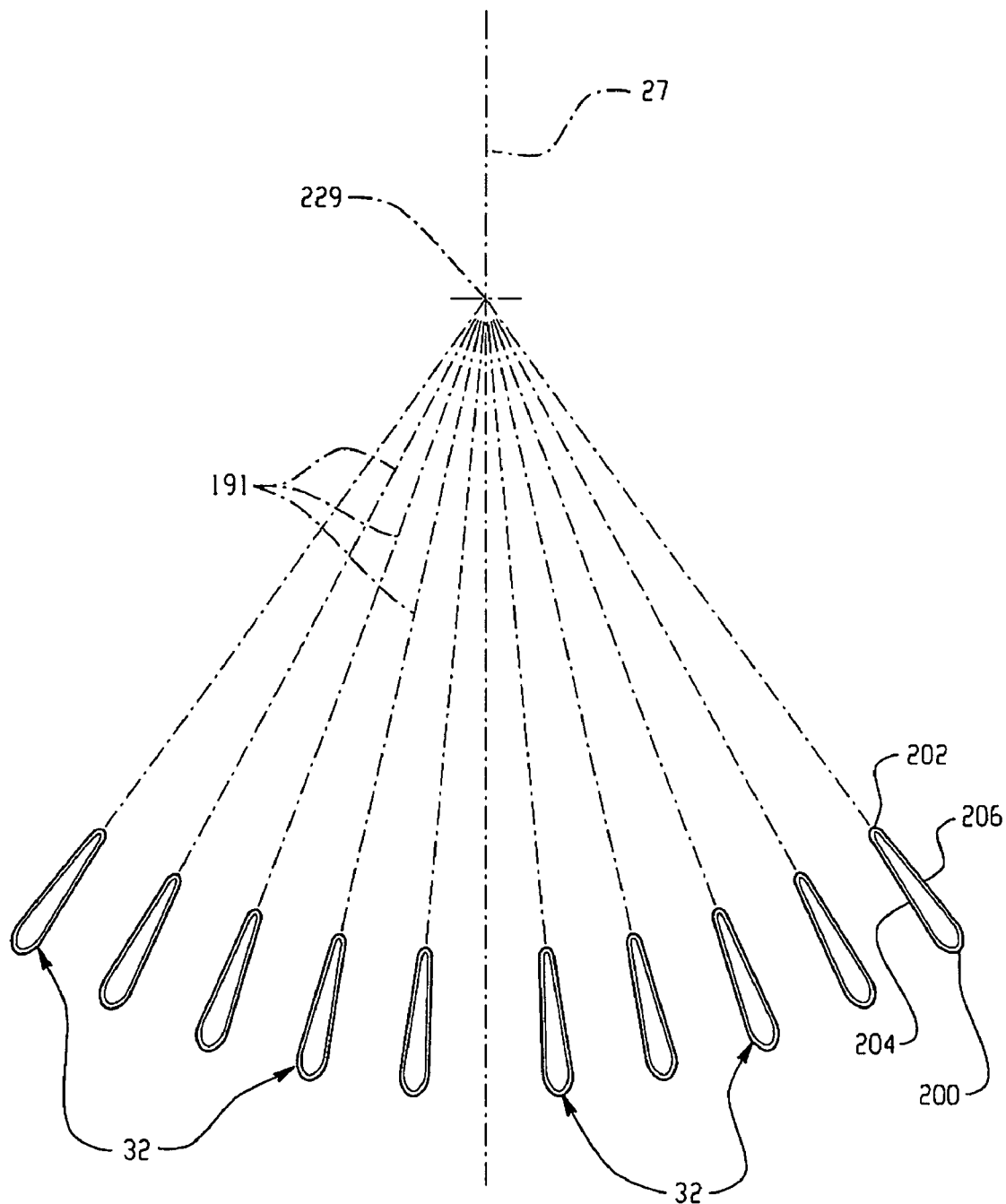
FIG. 3 is a schematic view of parts of the mobile device of FIG. 1.

FIG. 3 shows the top row 220 of keys 32 as an example to illustrate features that are common to all three rows 220, 222 and 224 that are shown in FIG. 1. The top row 220 of keys 32 is thus shown to have an arcuate configuration that is concave in a direction facing vertically upward. The keys 32 in the top row 220 are oriented with their longitudinal centerlines 191 projecting radially from a common center point 229. The common centerpoint 229 for the top row 220 of keys 32 is located on the longitudinal centerline 27 of the housing 12 at a position above the keyboard 14. The keys 32 in the top row 220 are equally spaced from the common centerpoint 229, and are uniformly spaced apart from each other along the length of the row 220. Although the keys 32 in the middle and bottom rows 222 and 224 likewise have respective common centerpoints (not shown) above the keyboard 14, those centerpoints are located farther down on the centerline 27. As further shown in FIG. 3, the first rounded end 200 of each key 32 is located radially outward of the second rounded end 202. Alternatively, the keys 32 could be inverted with their first rounded ends 200 located radially inward of their second rounded ends 202. The rows 220, 222 and 224 of keys 32 also could be inverted into arcs that are downwardly concave. Their respective centerpoints would then be located on the centerline 27 at positions below the keyboard 14.

This written description sets forth the best mode of carrying out the invention, and describes the invention to enable a person of ordinary skill in the art to make and use it, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have structural elements that do not differ from the literal language of the claims, or if they include equivalent structural elements with insubstantial differences from the literal language of the claims.

The invention claimed is:

1. An apparatus comprising:
   a keyboard panel having a QWERTY array of alphabetic key actuation indicia;
   a QWERTY array of keys that are free of alphabetic key actuation indicia and are located adjacent to corresponding alphabetic key actuation indicia on the keyboard panel;
   an output device responsive to actuation of the keys; and
   a processing device operatively coupled between the keys and the output device;
   wherein the keyboard panel further has a telephone keypad array of numerical key actuation indicia located in spaces extending horizontally between keys that are part of the QWERTY array; and
   wherein the keys are horizontally spaced apart from each other in the rows of the QWERTY array, and all of the corresponding alphabetic key actuation indicia on the keyboard panel are located in the spaces extending horizontally between the keys.

2. An apparatus as defined in claim 1 wherein the keyboard panel is defined by a housing that contains the output device and the processing device.

3. An apparatus as defined in claim 1 wherein the keyboard panel, the keys, the output device and the processing device are operatively interconnected pads of a hand-held mobile electronic device.

4. A mobile device comprising:
   a keyboard panel having a QWERTY array of alphabetic key actuation indicia;
   a QWERTY array of keys that are free of alphabetic key actuation indicia and are located adjacent to corresponding alphabetic key actuation indicia on the keyboard panel;
   an output device responsive to actuation of the keys; and
   a processing device operatively coupled between the keys and the output device;
   wherein the keyboard panel further has a telephone keypad array of numerical key actuation indicia located in spaces extending horizontally between keys that are part of the QWERTY array; and
   wherein the keys are horizontally spaced apart from each other in the rows of the QWERTY array, and all of the corresponding alphabetic key actuation indicia on the keyboard panel are located in the spaces extending horizontally between the keys.

5. A mobile device as defined in claim 4 wherein the keyboard panel is defined by a housing that contains the output device and the processing device.

* * * * *

UNITED STATES PATENT AND TRADEMARK OFFICE
CERTIFICATE OF CORRECTION

| | |
|---|---|
| PATENT NO. | : 7,311,454 B2 |
| APPLICATION NO. | : 11/595356 |
| DATED | : December 25, 2007 |
| INVENTOR(S) | : Pletikosa |

Page 1 of 1

It is certified that error appears in the above-identified patent and that said Letters Patent is hereby corrected as shown below:

Column 6, line 16, please replace "interconnected pads" with -- interconnected parts --

Signed and Sealed this

Eleventh Day of May, 2010

David J. Kappos
*Director of the United States Patent and Trademark Office*